United States Patent

[11] 3,577,191

[72] Inventor Eduard E. Haertlein
Fremont, Calif.

[21] Appl. No. 750,227
[22] Filed Aug. 5, 1968
[45] Patented May 4, 1971
[73] Assignee International Business Machines Corporation
Armonk, N.Y.

[54] MAGNETIC HEAD ASSEMBLY WITH SIDEBAR
8 Claims, 3 Drawing Figs.

[52] U.S. Cl. 340/174.1F, 179/100.2C
[51] Int. Cl. G11b 5/10, G11b 5/42
[50] Field of Search 340/174.1 (F), 174.1 (E); 179/100.2 (C), 100.2 (P); 346/74 (MC)

[56] References Cited

UNITED STATES PATENTS

| | | | |
|---|---|---|---|
| 3,365,709 | 1/1968 | Gooch | 340/174.1 |
| 3,383,667 | 5/1968 | Stark | 340/174.1 |
| 2,763,729 | 9/1956 | Camras | 179/100.2 |
| 2,888,522 | 5/1959 | McCutchen, Jr. et al. | 179/100.2 |
| 2,928,907 | 3/1960 | Lubkin | 179/100.2 |
| 3,024,318 | 3/1962 | Duinker et al. | 179/100.2 |
| 3,382,325 | 5/1968 | Camras | 179/100.2 |

*Primary Examiner*—Bernard Konick
*Assistant Examiner*—Vincent P. Canney
*Attorney*—Hanifin and Jancin

ABSTRACT: A magnetic head assembly, useful for noncontact magnetic recording, is formed to provide an inner cavity, wherein a thin magnetic core is fixed against a cavity wall. A magnetic sidebar, to which electrical coils are mounted, is secured adjacent to the core to complete the magnetic circuit.

INVENTOR.
EDUARD E. HAERTLEIN
BY Nathan N. Kallman
ATTORNEY

MAGNETIC HEAD ASSEMBLY WITH SIDEBAR

CROSS-REFERENCE TO RELATED APPLICATION

A head arm assembly that serves to mount the magnetic head assembly, made in accordance with this invention, is disclosed in copending application Ser. No. 722,007, filed Apr. 17, 1968 and assigned to the same assignee.

BACKGROUND OF THE INVENTION

1. Field of the Invention

This invention relates to a magnetic head assembly, and in particular to a gliding head slider structure used in noncontact recording-type magnetic disc files.

2. Description of the Prior Art

In some presently known magnetic storage systems, it is preferable to employ a magnetic head assembly that follows the contours of the storage medium during the record and readout processes. This is especially true in magnetic disc files employing noncontact transducing, wherein the magnetic transducing elements are required to be very close, say 100 microinches, to the surface of the record medium or disc. Spurious variations in the flying height of the transducer affect the resolution and amplitude of the data signal being stored or read out. Therefore, the magnetic transducer is generally mounted in an air bearing slider that floats, by hydrodynamic action, over the rotating disc.

With the need for high density and high frequency recording, the length of the transducing gap and accordingly the overall size of the magnetic transducer has been made much smaller. Gap lengths of 100 microinches are presently used, and gap lengths of 50 microinches or less are feasible, to enhance data signal packing density. However, when reducing the dimensions of the transducing gap and the size and thickness of the magnetic core, the transducer structure becomes subject to mechanical and structural weaknesses and instability. Also, with reduced size transducer structures such as used for high density recording, especially those incorporating ferrite cores, the yield during manufacture and handling is not optimum because the assembly is fragile and brittle, and lacks adequate structural support. In addition, during operation of apparatus using such transducer assemblies, undue wear and degradation of the transducer are experienced, requiring frequent replacement.

SUMMARY OF THE INVENTION

An object of this invention is to provide a novel and improved magnetic head slider assembly useful for noncontact recording.

Another object of this invention is to provide a magnetic head slider assembly having relatively small dimensions, yet having increased structural strength.

According to this invention, a magnetic head slider assembly is formed to encompass an inner cavity, wherein a magnetic core is secured, preferably by bonding, to a cavity wall. A sidebar of magnetic material is fixed firmly against the core body, for example, by elastomeric means, that is positioned to wedge the sidebar against the core. The sidebar completes a magnetic circuit with the core, the core including a nonmagnetic transducing gap that is disposed at the bottom surface of the slider structure. Electrical coils are wound to the sidebar for connection to an electrical read-write circuit. By means of this configuration, the magnetic core obtains full structural support from the inner wall of the slider structure, and the sidebar and coils are easily assembled to the core.

BRIEF DESCRIPTION OF THE DRAWINGS

The foregoing and other objects, features and advantages of the invention will be apparent from the following more particular description of a preferred embodiment of the invention, as illustrated in the accompanying drawings, in which.

Similar numerals refer to similar elements throughout the drawing.

DESCRIPTION OF THE PREFERRED EMBODIMENT

Figures 1, 2, 3:
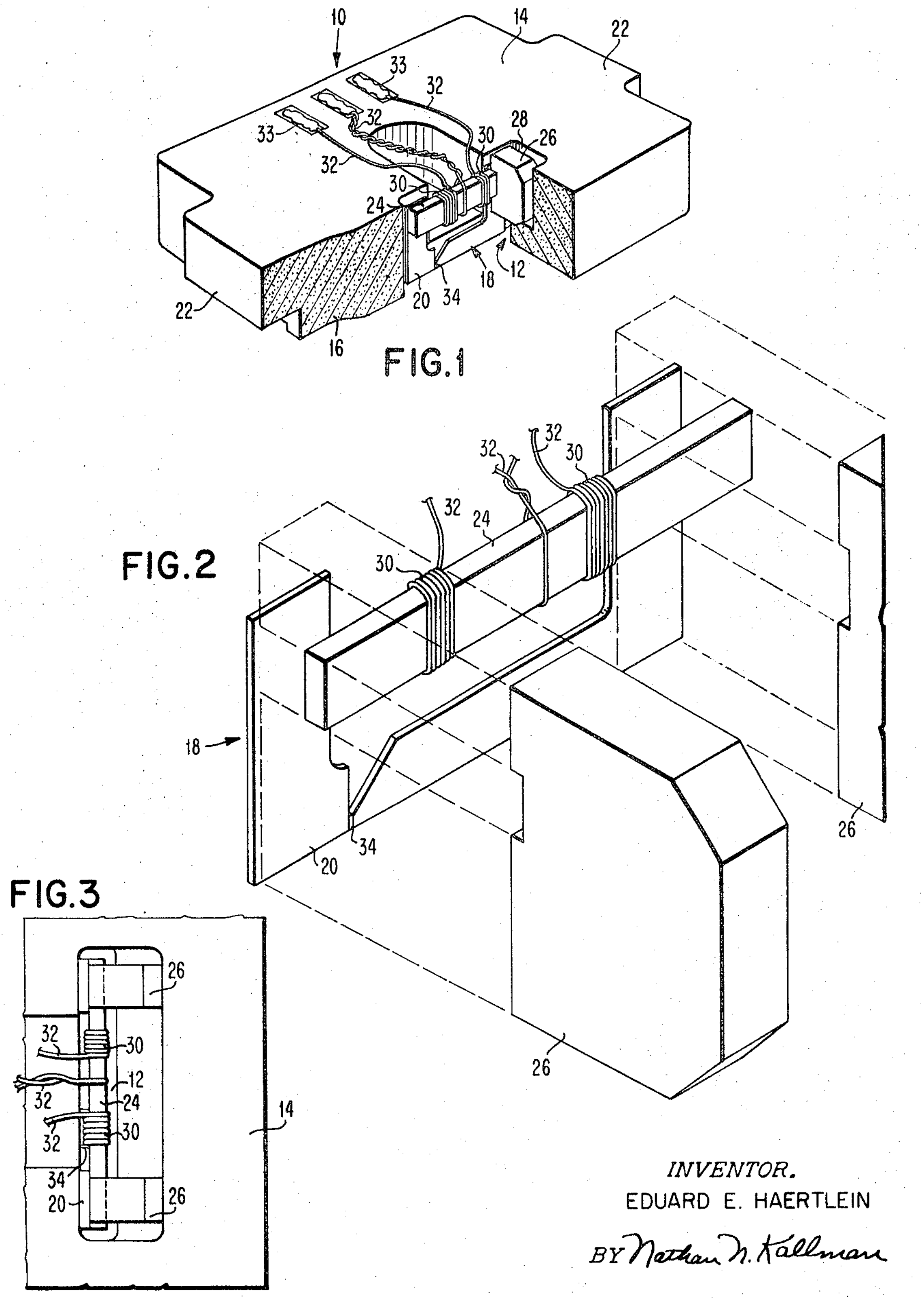
FIG. 1 is a perspective view of a magnetic head slider, partly broken away, to expose the transducer assembly, made in accordance with this invention.
FIG. 2 is an exploded, enlarged view of the transducing elements and retaining means.
FIG. 3 is a top plan view, in breakaway, of a portion of the head slider structure.

With reference to the drawing, a magnetic head slider structure 10 includes an inner cavity 12 which extends from a top surface 14 to a bottom surface 16 of the slider structure. In accordance with this invention, a transducing assembly 18 is secured within the cavity 12 to attain full support of the relatively thin transducer core 20, which is positioned against a wall of the cavity.

The slider structure 10 has two extensions or ears 22, which are metallized and used for attachment to a flexure (not shown) of a magnetic head arm assembly, such as used in data storage disc files and disclosed in the aforementioned copending patent application.

A sidebar 24, made of magnetic material such as ferrite, by way of example, is placed in juxtaposition to the upper portion of the core 20, thereby completing a magnetic circuit or loop with the U-shaped core. The sidebar 24 also serves to provide structural strength to the leg portions of the core 20. To maintain the sidebar 24 in a rigid position, clamps 26, which may be made of hard rubber or the like, are set into recesses 28 formed adjacent to the ends of the sidebar 24 and next to the core 20, and are wedged between the sidebar and the wall of the cavity 12 opposing the wall that supports the core. The core 20 is therefore rigidly supported by the pressure of the sidebar 24 and the cavity wall. To fix the core 20 in position, the core is bonded to the supporting wall of the cavity 12, preferably by a glass that has a coefficient of thermal expansion substantially the same as that of the core, which may be ferrite by way of example, and that of the slider material. The bonded core realizes improved handling characteristics and reduced breakage.

Electrical coils 30 used for the read and write functions are wound to the sidebar 24 prior to assembly within the slider structure. The leads 32 from the electrical coils 30 are brought out through the top of the cavity 12 across the top surface 14 and joined to terminals 33 which are connected to a diode matrix enabling head energization and further utilization.

The nonmagnetic transducing gap in the core 20 is disposed at the bottom surface 16 of the slider structure 10, which is formed as an air bearing. The air bearing surface 16 may be planar or convex to afford the proper gliding or flying height with respect to a rotating disc. The slider structure 10 is preferably made of a nonmagnetic ceramic, having good wear characteristics and having a coefficient of thermal expansion similar or close to that of the magnetic material used for the core 20.

Various advantages are derived from the novel assembly disclosed herein. For example, in prior heat assemblies, an epoxy was generally employed for bonding the magnetic core to the slider structure. However, the use of epoxy is known to result in poor stability of the assembly. Also, since the coefficient of thermal expansion of the epoxy is different from that of the ferrite used for the core, mechanical stresses and distortion and displacement occur. By utilizing glass, the need for an epoxy is eliminated. Also, ferrite heads preferably employ a bonding glass in the transducing gap for structural strength. By using a glass for bonding the core to the cavity wall having a lower melting temperature than the softening temperature of the gap glass, the gap glass does not flow during the core bonding process. By means of the disclosed assembly, the surface area for bonding of the core is greatly increased, and therefore core movement relative to the slider structure is minimized.

Furthermore, the narrow clearance provided between the core 20 and the wall of the cavity 12 in the slider 10 allows optical setting of the throat height, which is a determinative factor of the performance of the transducer. This clearance also affords the use of a high temperature curing epoxy adhesive, which provides a more stable assembly than one using a filled epoxy potting compound.

Also, the use of a shaped wedge or clamp 26 enables simple location and alignment of the sidebar 24 with respect to the bottom of the cavity 12 and the legs of the core 20, and thus allows repeatability in mass production. Other advantages and features are available with the simplified, yet improved head assembly construction of this invention.

While the invention has been particularly shown and described with reference to a preferred embodiment thereof, it will be understood by those skilled in the art that the foregoing and other changes in form and details may be made therein without departing from the spirit and scope of the invention.

I claim:

1. A magnetic head assembly comprising:

a nonmagnetic housing having a cavity formed therein, said cavity having two opposing walls;

a U-shaped magnetic core including two L-shaped portions with a nonmagnetic gap disposed between the ends of the facing base portions of each L:

said magnetic core having one of its U-shaped faces bonded to and supported by one of said walls for accurately positioning said core in said cavity;

a magnetic sidebar positioned against and abutting the other U-shaped face of said core disposed away from said nonmagnetic gap for closing a magnetic circuit through said U-shaped magnetic core and said magnetic sidebar; and resilient means for securing said sidebar against said other u-shaped face of said core.

2. A magnetic head assembly as in claim 1, including electrical coils coupled to said sidebar.

3. A magnetic head assembly as in claim 1, wherein said bonding material has a coefficient of thermal expansion substantially the same as that of said core and said nonmagnetic housing.

4. A magnetic head assembly as in claim 1, wherein said bonding material is glass.

5. A magnetic head assembly as in claim 1, wherein said nonmagnetic housing has an air bearing surface at which the nonmagnetic gap is disposed, for transducing relation with a magnetic medium.

6. The magnetic head assembly set forth in claim 1, wherein said resilient means wedgingly extend between the other of said opposing walls of said cavity and said other U-shaped face of said core and against said magnetic sidebar for holding said sidebar against said core and for maintaining said core fixedly against said cavity wall.

7. A magnetic head assembly as in claim 6, including recesses formed at the ends of said sidebar for accommodating said resilient means.

8. A magnetic head assembly as in claim 6, wherein said resilient means comprise elastomeric clamps.